Nov. 28, 1933.                H. F. VICKERS                  1,937,367
                         BALANCED GEAR PUMP OR MOTOR
                            Filed Aug. 18, 1931            2 Sheets-Sheet 1
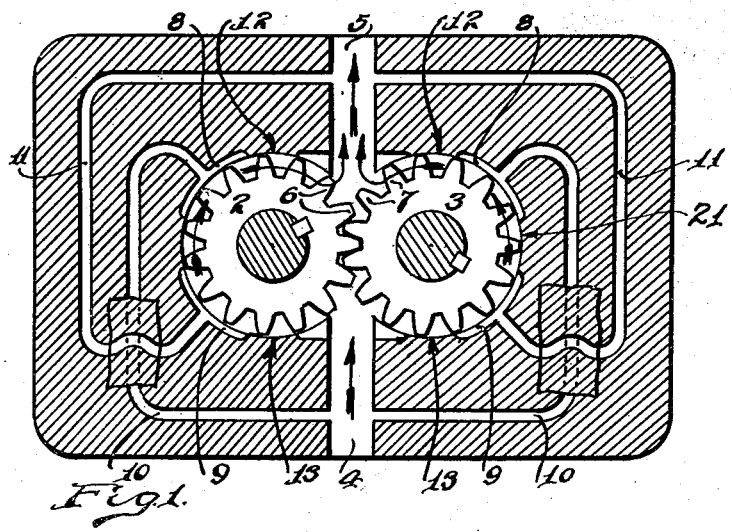
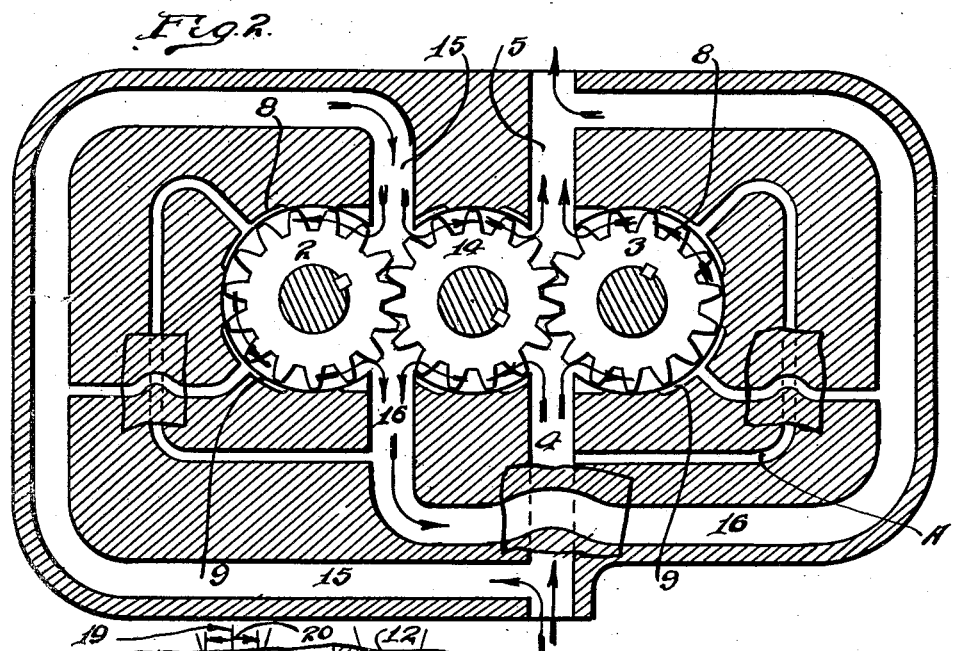
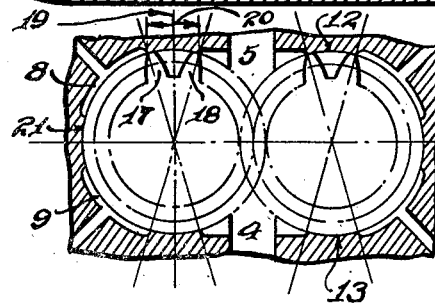
INVENTOR
HARRY F. VICKERS.
BY
Barnes & Kissell
ATTORNEYS

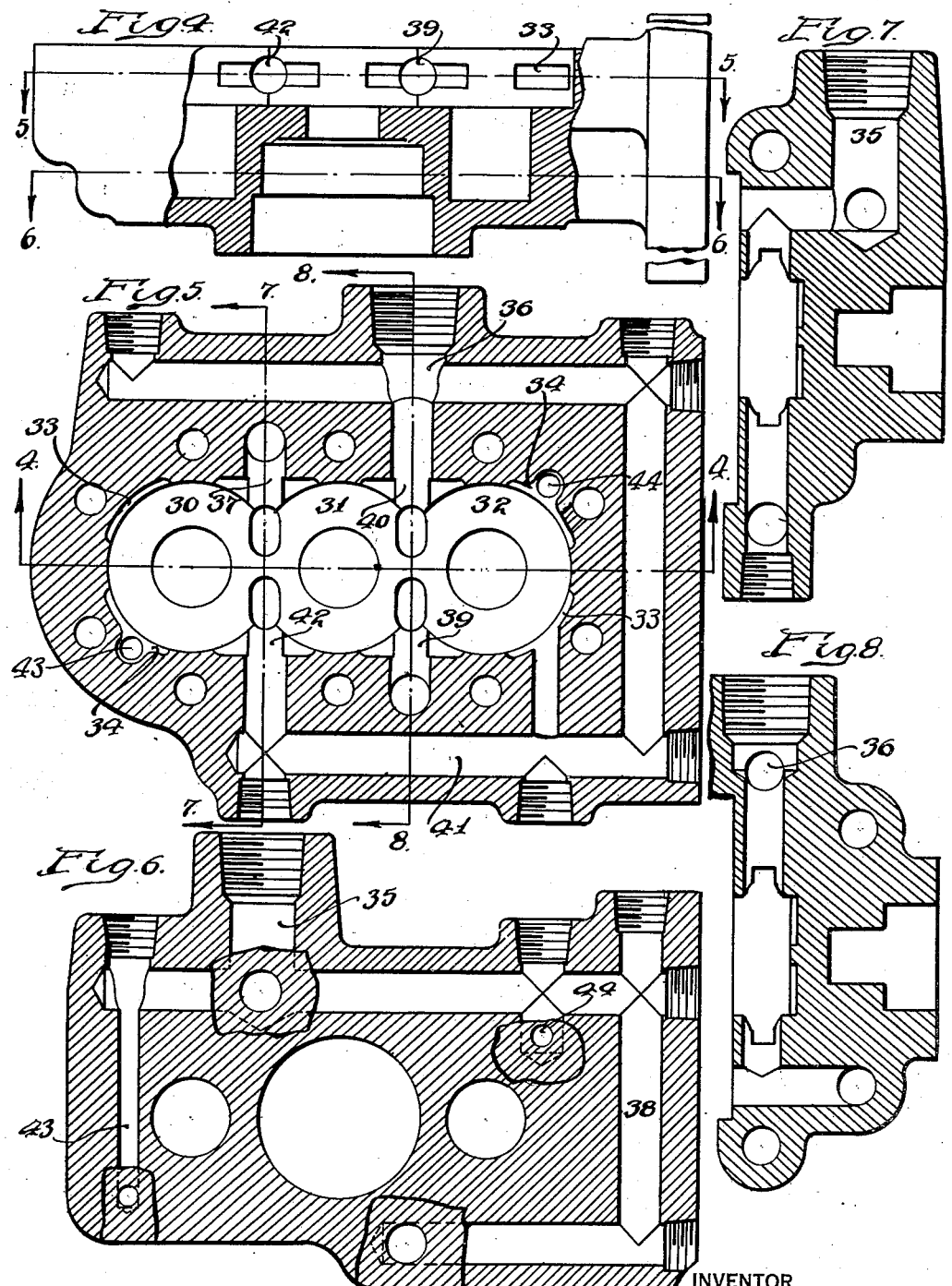

Patented Nov. 28, 1933

1,937,367

UNITED STATES PATENT OFFICE 1,937,367

BALANCED GEAR PUMP OR MOTOR

Harry F. Vickers, Detroit, Mich.

Application August 18, 1931. Serial No. 557,862

4 Claims. (Cl. 103—126)

This invention relates to a balanced gear pump or motor, and has to do particularly with a novel manner of inherently floating or balancing the gears within a housing.

By far the greater proportion of hydraulic pumps and motors are of the standard spur gear type, and the reason for this is that spur gears and pumps are the simplest in design and the cheapest to manufacture. Where relatively low pressures are encountered spur gear pumps are very satisfactory, but where relatively high pressures are necessary, a spur gear pump or motor has heretofore been unsatisfactory because of its rapid wear and loss of efficiency. Even the more expensive spur gear pumps and motors embodying ball bearings will not stand up under heavy pressures for a great length of time because of the great friction between the gears and a portion of the casing.

It is an object of the present invention to so float or balance the gears of a gear pump or motor as to give even the most simple design of spur gear unit a length of life and efficiency quite comparable to the more expensive hydraulic units now used for operating under relatively high pressures. More specifically, the present invention contemplates the forming of the surfaces of the housing or gear chamber into a plurality of circumferentially spaced guide surfaces and pressure recesses of predetermined dimensions and so arranged relative to each other, and the position of the main passageways for the liquid, as to counteract or balance the pressures tending to force the gear out of alignment with its bearings. A portion of the teeth of each gear, just before and just after meshing, are subjected to a relatively high pressure, or a relatively low or negative pressure, according to whether the unit is used as a pump or motor, and in my novel construction the pressure existing on the teeth exposed to the liquid in the intake and outlet passageways is balanced by the application of the same pressure at diametrically opposite points of the gear.

Other features of design and construction will be more clearly brought out in the specification and claims.

In the drawings:

Fig. 1 is a diagrammatic view of a standard spur gear hydraulic unit which may be used either as a pump or motor and illustrating a conventional arrangement of connecting conduits for insuring the balancing of pressures at diametrically opposite sides of the respective gears.

Fig. 2 is a view similar to Fig. 1 but illustrating the application of my balanced pressure principle to a multiple gear pump or motor.

Fig. 3 is a diagrammatic view illustrating the manner of determining the effective surface area of the guide surfaces of the gear casing and also the size of the pressure openings connecting the guiding surfaces.

Fig. 4 is an end view, having a partial section taken on line 4—4 of Fig. 5, illustrating a pump or motor housing fabricated to receive three gears as diagrammatically illustrated in Fig. 2.

Fig. 5 is a sectional view taken on line 5—5 of Fig. 4 and illustrating the arrangement and preferred fabrication of the gear chambers and the arrangement of the outlet conduits, in case the unit is used as a pump, and also showing some of the inlet ports.

Fig. 6 is a sectional view taken on line 6—6 of Fig. 4, and illustrating in particular the arrangement of inlet conduits when the unit is used as a pump.

Fig. 7 is a sectional view taken on line 7—7 of Fig. 5.

Fig. 8 is a sectional view taken on line 8—8 of Fig. 6.

The invention can be best understood by referring to the diagrammatic showings of Figs. 1, 2, and 3. In the embodiment shown in Fig. 1, two standard spur gears 2 and 3 are mounted upon suitable shafts in the usual manner; the unit may be assumed to be working as a pump in which case the passageway 4 will be the inlet and the passageway 5 will be the outlet or high pressure passageway.

Teeth 6 and 7 will not only be subjected to the pressure developed in the outlet passageway but because of slippage there will be a gradually diminishing pressure extending outwardly around each gear from the teeth 6 and 7. To maintain any degree of efficiency, the walls of the gear chambers must have and retain very close fit relative to the outer edges of the teeth and it will be obvious that if relatively great pressures are developed in the outlet passageways 5 that slightly less pressure will be present in between the teeth at the top part of each gear with the result that each gear will be forced against the lower side of the gear chamber thus causing considerable friction and wear between the gears and the bottom surfaces of each gear chamber.

To completely eliminate any pressure or friction between the gear teeth and the surface of the gear casings, I have provided depressions or what might be termed pressure chambers 8 and 9 which are preferably positioned diametrically opposite the high and low pressure chambers formed by the portions of the passageways 5 and 4 directly adjacent the gear teeth. The pressure chambers 8 are connected by means of conduits 10 to the low pressure intake 4, and the pressure chamber 9 is in turn connected by suitable conduits 11 to the high pressure outlet 5. It will thus be seen that whatever pressures exist against the exposed surfaces of the teeth in the inlet and outlet passageways will be applied to the diametrically oppositely positioned teeth with the result that the gears must necessarily float on their respective shafts. The pressure chambers 8 will relieve whatever pressure would normally exist at such points due to slippage so that it will be immaterial as far as the balancing of the gear is concerned just what pressure exists in the inlet passageway 4; that is, whether such pressure is relatively low or even a negative pressure. The effective surfaces 12 and 13 are just as efficient as if the valve chamber walls were solid all the way around, and they have the added advantage in that the close fit between the effective surfaces 12 and 13 and the gear teeth will be maintained for a much longer period than has heretofore been possible in standard spur gear units.

It will be readily seen that if the unit as illustrated in Fig. 1 is used as a motor that the passageway and associated chamber 4 will become the high pressure side and the passageway 5 and its associated chamber the low pressure side, with the result that a unit constructed in accordance with the disclosure of Fig. 1 will be equally well balanced whether it operates as a pump or a motor.

In the modification illustrated in Fig. 2 I have shown the preferred method of balancing the gears in a spur gear unit containing three gears. Here the outside gears 2 and 3 operate and are balanced in the same manner as set forth in Fig. 1, and in operating as a pump this three gear unit also will have the main low pressure inlet passageway and the main high pressure outlet passageway. By using a third gear 14 it is necessary to have an auxiliary low pressure passageway 15 for feeding the liquid to the gears 2 and 14 and an auxiliary passageway 16 for connecting the high pressure side of the gears 2 and 14 and gears 3 and 14. The pressure chambers 8 and 9 adjacent the gear 3 operate in the same manner as described in connection with Fig. 1 but the pressure chambers 8 and 9 adjacent the gear 2 are reversed from that described in connection with Fig. 1, in that in Fig. 2 the pressure chamber 8 is the high pressure chamber and the pressure chamber 9 is the low pressure chamber, when operating as a pump. The gear 14 is balanced because the pressure chambers formed by the passageways 5 and 16 are diametrically balanced and the same is true of the pressure chambers formed by the passageways 4 and 15.

In Fig. 3 I have illustrated the preferred manner of fabricating the housing or casing surrounding the periphery of the gears, and in designing the unit two teeth 17 and 18 are positioned equidistantly on each side of a vertical center line 19 and the distance 20 between the outside edges of the two teeth is taken as the correct distance of the effective surface area 12. By having the effective area 12 the width of two teeth, it will be seen that the pressure chambers 8 and 9 are always completely separated from the main conduits 4 and 5. By having the center effective surface area 21 of the same size as the effective surface area 12, it will be seen that the pressure chambers 8 and 9 are correctly proportioned according to the effective area of the teeth exposed to the chambers formed by the passageways 4 and 5. In other words, the length of the pressure chamber 8 is predetermined in accordance with the width of two teeth of the gear.

I have found by experiment that with a gear unit, such as shown in Fig. 2, operating as a motor, and with a valve placed in the conduit as at A, that when said valve is closed the motor will immediately stop, and will start again when the valve is open. This shows that when operating under high pressures that the pressure against the gear is so great as to cause the same to bind against the opposite back wall of the gear chamber and completely stop the motor. The motor, of course, could be operated at much lower pressures but this serves to illustrate the amount of pressure and friction between the gear and the gear chamber wall unless balanced.

In Figs. 4 to 8 I have shown the adaptation of a unit such as diagrammatically shown in Fig. 2 to a unit and casting of practical design. In this case, referring particularly to Fig. 5, I have shown an integral unit embodying the spur gear chambers 30, 31, and 32, and provided with the pressure chambers 33 and 34. When operating as a pump, the conduit 35 becomes the inlet and the conduit 36 the outlet. The conduit 35, as shown in Fig. 6 is connected by means of a cross conduit to the low pressure chamber 37 and by means of an auxiliary conduit 38 to the low pressure chamber 39. The exhaust conduit 36 is directly connected to the high pressure chamber 40 and by means of the auxiliary conduit 41 to the high pressure chamber 42. The pressure chambers 33 are connected to the high pressure exhaust conduit 36, as shown in Fig. 5, and the pressure chambers 34 are connected to the inlet conduit 35 by means of the auxiliary passageways 43 and 44.

It will thus be seen that regardless of its operation as a pump or a motor, or regardless of the respective pressures on the inlet and outlet sides of the unit and regardless of what action might take place in the enclosed portions of the gear teeth, that the portions of the gear teeth diametrically opposite the gear teeth exposed to the inlet and outlet passageways will be balanced with respect to the pressure applied to the exposed portion of the gear, so that whether the effective operating pressure of the pump or motor is one hundred pounds or five hundred pounds or more, the gears will all float in their respective chambers.

What I claim is:

1. A balanced hydraulic pump or motor unit, comprising meshing gears, a housing forming inlet and outlet chambers, one of which is a relatively high pressure chamber, and a gear chamber enclosing a portion of a gear, the circumferential wall of said gear chamber having three spaced guide surfaces each having an effective length substantially equal to the distance between the outside edges of two adjacent gear teeth, the two spaces formed between said guide surfaces forming balancing chambers connected to and diametrically positioned from the inlet and outlet chambers, both balancing chambers acting to balance the gear at all times during operation in one direction, one of said guide surfaces being positioned diametrically opposite said point of meshing and the other two guide surfaces being at opposite ends of the gear chamber.

2. A balanced hydraulic gear unit comprising meshing gears, a housing forming inlet and outlet chambers and a gear chamber enclosing a portion of a gear, the circumferential wall of said chamber having a guide surface positioned diametrically opposite said point of meshing and having a length no greater than the distance between the outside edges of two adjacent gear teeth, and two guide surfaces positioned substantially 90° in each direction from said first guide surface, the two spaces formed between said guide surfaces forming balancing chambers connected to and diametrically positioned from the inlet and outlet chambers, both balancing chambers acting to balance the gear at all times during operation in one direction, and applying balancing pressure to substantially the same gear teeth area as exposed in the inlet and outlet chambers, the two guide surfaces positioned substantially 90° from the first guide surface having a circumferential length just sufficient to always completely separate the inlet and outlet chambers from the balancing chambers.

3. A balancing hydraulic gear unit comprising meshing gears, a housing forming inlet and outlet chambers and a gear chamber enclosing a portion of a gear, the circumferential wall having three spaced guide surfaces which form the sole bearing surfaces for said gear, two of said surfaces being in substantial alignment through the axis of the gear shaft and the third at right angles thereto and substantially opposite the point of meshing of the gears, balancing chambers formed in said wall in between said guide surfaces and in communication with said inlet and outlet chambers, and one of said chambers forming a pressure chamber and the other a relief chamber, said guide surfaces having a circumferential length substantially equal to the distance between the outside edges of two adjacent teeth of the gear, both said pressure and relief chambers being active and producing a balancing effect at all times during operation of the gear in one direction, the relief chamber and the relatively short length of the guide surface between the relief chamber and the inlet or outlet pressure chamber preventing accumulation of pressure between the teeth and hence minimizing friction between the diametrically opposite portion of the gear and that portion of the opposite guide surface which is closest the point of meshing.

4. In a hydraulic pump or motor of the gear type, the combination of a housing forming inlet and outlet chambers and a gear chamber enclosing a portion of a gear, pressure chambers formed in the circumferential wall of said gear chamber and positioned diametrically opposite the inlet and outlet chambers, a bearing surface positioned diametrically opposite the point of meshing of the gears and separating the pressure chambers, bearing surfaces positioned substantially 90° from said first bearing surface and separating the pressure chambers from the inlet and outlet chambers, a portion of the housing adjacent the inlet and outlet chambers being cut away to increase the predetermined peripheral tooth surface area constantly subjected to pressure in the inlet and outlet chambers, the circumferential length of the pressure chambers being substantially equal to the peripheral length of gear exposed in the inlet and outlet chambers, the circumferential length of said bearing surfaces being substantially equal to the distance between the outside edges of two adjacent gear teeth whereby the peripheral exposed portion of the gear in the inlet and outlet pressure chambers is equal to or greater than the circumferential length of the bearing surfaces.

HARRY F. VICKERS.